United States Patent
McCormick et al.

(10) Patent No.: US 10,196,131 B2
(45) Date of Patent: Feb. 5, 2019

(54) HYDRAULIC SYSTEM AND METHOD FOR AN AIRCRAFT FLIGHT CONTROL SYSTEM

(71) Applicant: The Boeing Company, Chicago, IL (US)

(72) Inventors: Patrick J. McCormick, Mukilteo, WA (US); Neal V. Huynh, Bellevue, WA (US); Timothy G. Overton, Lynnwood, WA (US); Alan Marx, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 301 days.

(21) Appl. No.: 15/045,237

(22) Filed: Feb. 16, 2016

(65) Prior Publication Data

US 2017/0233064 A1 Aug. 17, 2017

(51) Int. Cl.
*B64C 13/40* (2006.01)
*B64C 13/42* (2006.01)

(52) U.S. Cl.
CPC .................... *B64C 13/42* (2013.01)

(58) Field of Classification Search
CPC ... B64C 13/40; B64C 13/42; B64C 2009/005; B64C 2009/16; B64C 13/00; B64C 13/10; Y02T 50/32; Y02T 50/44
See application file for complete search history.

(56) References Cited

U.S. PATENT DOCUMENTS 2,389,274 A * 11/1945 Pearsall, Jr. ............ B64C 13/00
244/226
3,699,369 A * 10/1972 Hlipala ................... F16F 15/18
244/223
3,747,876 A * 7/1973 Fortna ..................... B64C 13/24
244/223
3,862,730 A * 1/1975 Heiney ................... B64C 13/46
244/17.13
4,106,728 A * 8/1978 Griffith ................... B64C 13/46
244/221
4,236,685 A * 12/1980 Kissel ..................... B64C 13/46
244/178
4,363,098 A * 12/1982 Buus ..................... G05D 1/0808
244/175
4,403,756 A * 9/1983 Berlin .................... B64C 13/46
244/226
4,426,607 A * 1/1984 Black ..................... B64C 13/38
244/223
4,477,043 A * 10/1984 Repperger .............. B64C 13/04
244/178
4,704,865 A * 11/1987 Archung ................. B64C 13/42
244/226
4,711,089 A * 12/1987 Archung ................. B64C 13/42
244/226
4,729,528 A * 3/1988 Borzachillo ............. B64C 3/50
244/90 R (Continued)

*Primary Examiner* — Medhat Badawi

(57) ABSTRACT

A hydraulic system of an aircraft may include a system pump configured to provide hydraulic fluid to the hydraulic system at a first working pressure. The hydraulic system may further include a booster pump configured to supply hydraulic fluid to at least one boostable actuator at a second working pressure higher than the first working pressure. The boostable actuator may be operatively coupled to and configured to actuate at least one flight control surface of an aircraft.

13 Claims, 10 Drawing Sheets

(56) References Cited

U.S. PATENT DOCUMENTS

| | | | | |
|---|---|---|---|---|
| 4,967,557 A * | 11/1990 | Izumi | E02F 9/2025 | 60/423 |
| 4,973,408 A * | 11/1990 | Keefer | B01D 61/06 | 210/137 |
| 5,059,882 A * | 10/1991 | Marcillat | B64C 13/04 | 200/6 A |
| 5,100,082 A * | 3/1992 | Archung | B64D 41/00 | 244/76 R |
| 5,246,768 A * | 9/1993 | Rostaing | C23C 16/30 | 428/213 |
| 5,264,768 A * | 11/1993 | Gregory | G05B 19/409 | 244/236 |
| 5,347,204 A * | 9/1994 | Gregory | B64C 13/04 | 244/223 |
| 5,351,914 A * | 10/1994 | Nagao | B64C 13/40 | 244/194 |
| 5,659,485 A * | 8/1997 | Lee | F04B 49/065 | 60/487 |
| 6,578,425 B2 * | 6/2003 | Hickman | B64C 13/40 | 73/716 |
| 6,799,739 B1 * | 10/2004 | Jones | B64C 13/40 | 244/10 |
| 7,059,563 B2 * | 6/2006 | Huynh | B64C 9/16 | 244/226 |
| 7,338,018 B2 | 3/2008 | Huynh | | |
| 8,374,804 B2 * | 2/2013 | Hickman | G01P 5/14 | 244/223 |
| 8,596,575 B2 * | 12/2013 | Ito | F15B 11/0365 | 244/99.2 |
| 8,600,584 B2 * | 12/2013 | Fervel | B64C 13/50 | 701/3 |
| 2003/0183728 A1 * | 10/2003 | Huynh | B64C 13/10 | 244/224 |
| 2005/0171652 A1 * | 8/2005 | Speer | B64C 9/00 | 701/4 |
| 2005/0224662 A1 * | 10/2005 | Lacy | B64C 9/24 | 244/214 |
| 2005/0242234 A1 * | 11/2005 | Mahmulyin | B64C 9/16 | 244/75.1 |
| 2005/0242243 A1 * | 11/2005 | Seve | B64C 9/32 | 244/213 |
| 2005/0274847 A1 * | 12/2005 | Charron | B64C 31/02 | 244/123.1 |
| 2006/0000952 A1 * | 1/2006 | Rampton | B64C 9/22 | 244/214 |
| 2006/0038086 A1 * | 2/2006 | Reckzeh | B64C 3/10 | 244/198 |
| 2006/0049308 A1 * | 3/2006 | Good | B64C 3/50 | 244/76 A |
| 2006/0102803 A1 * | 5/2006 | Wheaton | B64C 7/02 | 244/214 |
| 2006/0175468 A1 * | 8/2006 | Huynh | B64C 9/16 | 244/212 |
| 2006/0245882 A1 * | 11/2006 | Khan | B60P 1/006 | 414/525.5 |
| 2017/0233064 A1 * | 8/2017 | McCormick | B64C 13/40 | 244/99.5 |

* cited by examiner

HYDRAULIC SYSTEM AND METHOD FOR AN AIRCRAFT FLIGHT CONTROL SYSTEM

FIELD

The present disclosure relates generally to the aircraft flight control systems and, more particularly, to a system and method of operating a hydraulic system of an aircraft flight control system.

BACKGROUND

Aircraft typically include a flight control system for directional and attitude control of the aircraft in response to commands from the flight crew or an autopilot. A flight control system may include a plurality of movable flight control surfaces such as ailerons for roll control, elevators for pitch control, and a rudder for yaw control. The flight control surfaces may also include various devices for altering the lift and/or drag characteristics of the wings including leading edge devices (e.g., slats), trailing edge devices (e.g., flaps), and spoilers. Movement of the flight control surfaces is typically effected by actuators that may be mechanically coupled to the flight control surfaces. In many aircraft, actuators for flight control surfaces are hydraulically-driven by one or more centralized hydraulic systems which typically operate at a fixed operating pressure.

Hydraulic systems for aircraft are typically designed such that the flight control surfaces can be actuated in a manner allowing the aircraft to perform maneuvers covering all corners of the flight envelope, including outlier flight conditions. An outlier flight condition may require deflection of a flight control surface to a relatively high deflection angle during the failure of a hydraulic system powering one of the actuators. For example, an outlier flight condition may require deflection of the ailerons in a manner allowing the aircraft to achieve a relatively high bank angle within several seconds despite the failure of one of the redundant aileron actuators. Such a large deflection angle may require relatively high actuation forces in the actuators.

One solution for achieving high actuation forces for outlier conditions includes adding another actuator to the flight control surface. For example, in the above-noted example, instead of using two actuators on the aileron, a third actuator may be added such that a high actuation force may be generated by two of the actuators in the event that the third actuator is incapacitated due to a failure of one of the hydraulic systems. Unfortunately, the addition of a third actuator adds weight and complexity to the aircraft due to the need to route three hydraulic systems to the aileron. Another solution for achieving high actuation forces for outlier conditions includes using tandem actuators having multiple pistons, which unfortunately also adds weight and complexity to the flight control system. A further solution is to increase the working pressure of each of the hydraulic systems operating a flight control surface. Unfortunately, increasing the working pressure of a hydraulic system requires an increase in the size of all components of the hydraulic system which also adds weight to the aircraft.

As can be seen, there exists a need in the art for a system and method for increasing the actuation force capability of flight control surface actuators with a minimal increase in weight and complexity.

SUMMARY

The above-noted needs associated with hydraulic systems for aircraft flight control systems are specifically addressed and alleviated by the present disclosure which provides a hydraulic system of an aircraft having a system pump, a booster pump, and a boostable actuator. The system pump may be configured to provide hydraulic fluid to the hydraulic system at a first working pressure. The booster pump may be configured to supply hydraulic fluid to at least one boostable actuator at a second working pressure higher than the first working pressure. The boostable actuator may be configured to actuate at least one flight control surface of an aircraft.

In a further embodiment, disclosed is a hydraulic system for an aircraft including a first boostable actuator and a second boostable actuator operatively coupled to an aileron of an aircraft. The hydraulic system may include a system pump configured to supply hydraulic fluid to the first boostable actuator and the second boostable actuator at a first working pressure. In addition, the hydraulic system may include a first booster pump and a second booster pump configured to increase the pressure of the supplied hydraulic fluid to a second working pressure higher than the first working pressure. The first booster pump and the second booster pump may the hydraulic fluid respectively to the first boostable actuator and the second boostable actuator at the second working pressure for actuating the aileron.

Also disclosed is a method of operating a hydraulic system of a flight control system of an aircraft. The hydraulic system may have a system pump configured to provide hydraulic fluid to the hydraulic system at a first working pressure. The method may include identifying, using a boost controller communicatively coupled to a booster pump, when an aircraft is commanded to perform a maneuver. In addition, the method may include activating, using the boost controller, the booster pump to provide hydraulic fluid to the boostable actuator at a second working pressure after determining that the boostable actuator operating under the first working pressure is incapable of actuating the flight control surface in a manner allowing the aircraft before may commanded maneuver. The method may also include supplying, using the booster pump, hydraulic fluid to the at least one boostable actuator at a second working pressure higher than the first working pressure. Additionally, the method may include actuating a flight control surface using the at least one boostable actuator operating at the second working pressure, and de-activating, using the boost controller, the booster pump such that the pressure of the hydraulic fluid supplied to the at least one boostable actuator decreases from the second working pressure.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
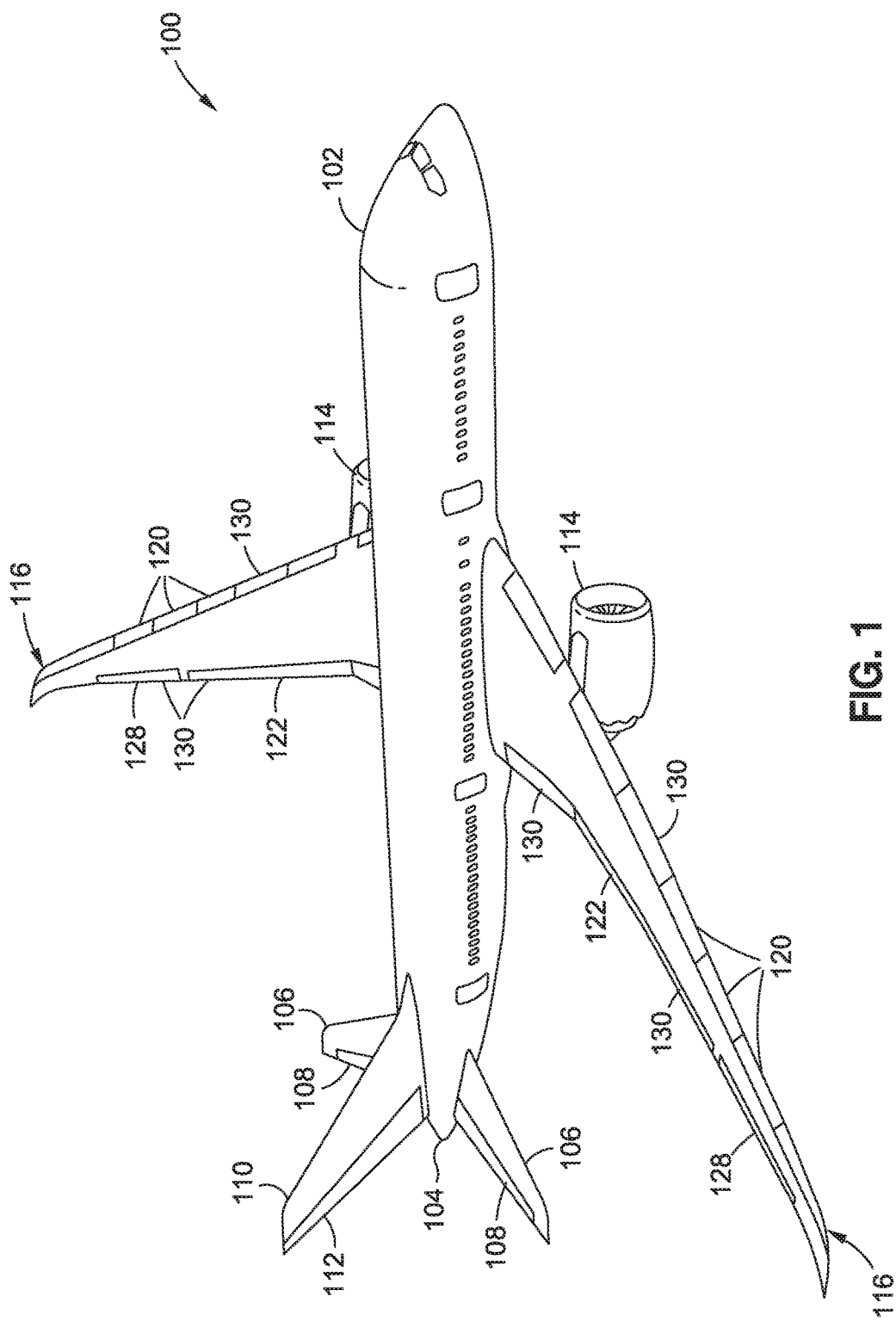
FIG. 1 is a perspective view of an aircraft.

Referring now to the drawings wherein the showings are for purposes of illustrating various embodiments of the present disclosure, shown in FIG. 1 is an aircraft 100 which may incorporate one or more examples of a hydraulic system 152 (e.g., FIG. 2) having a boost function capability as disclosed herein. The aircraft 100 may include a fuselage 102 having an empennage 104 at an aft end of the fuselage 102. The empennage 104 may include a vertical tail 110 having a rudder 112 and one or more horizontal tails 106 each having an elevator 108. The rudder 112 and elevators 108 may form part of the flight control system 150 (e.g., FIG. 2) of the aircraft 100. The aircraft 100 may additionally include a pair of wings 116 extending outwardly from the fuselage 102, and may include one or more propulsion units 114. The flight control surfaces 130 of the wings 116 may include ailerons 128, leading-edge devices 120, trailing edge devices 122, spoilers 118 (shown in FIG. 2), and/or other flight control surfaces 130. The flight control surfaces 130 of the wings 116 may be operated separately and/or in conjunction with the flight control surfaces 130 (e.g., rudder 112 and elevators 108) of the empennage 104.

Figure 2:
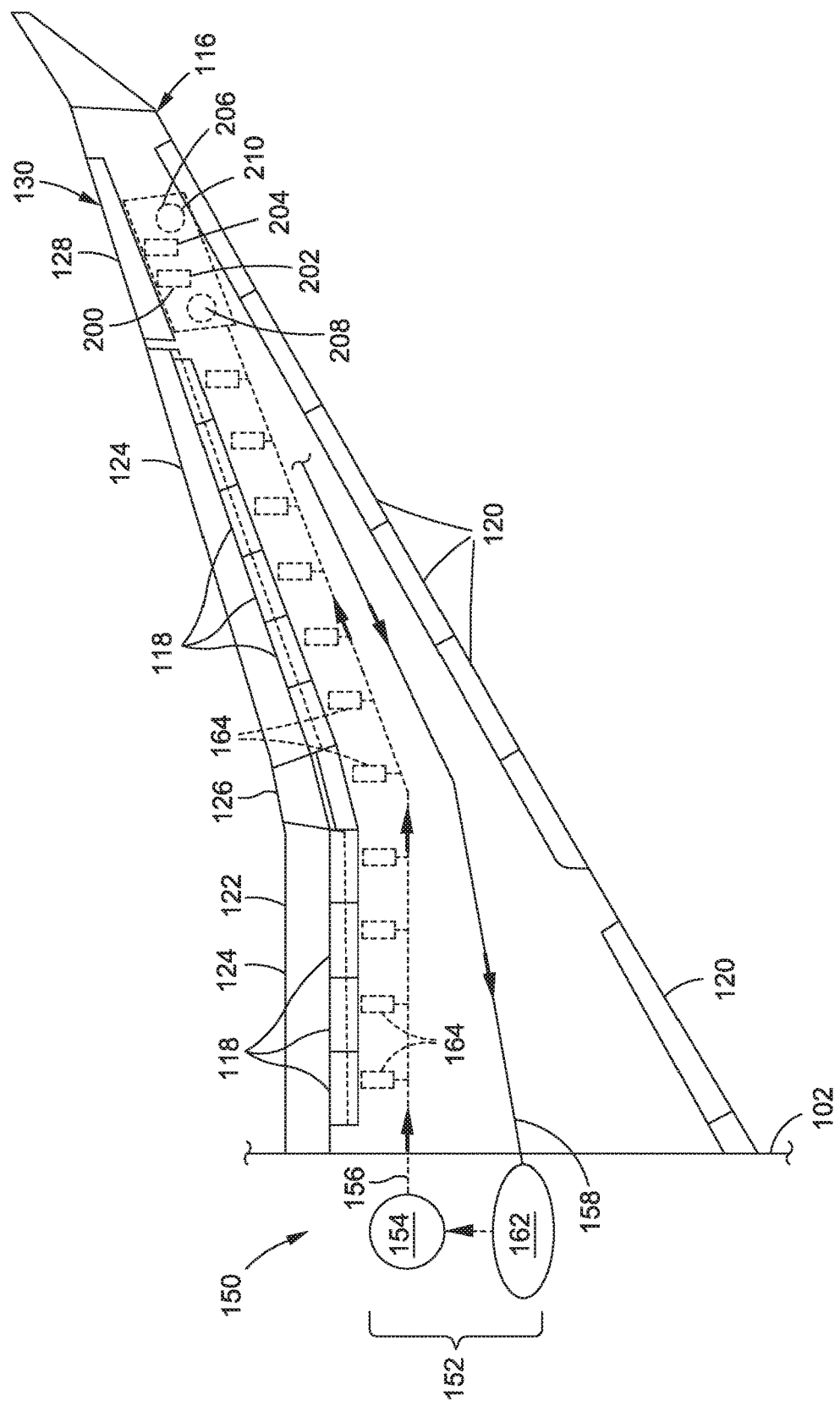
FIG. 2 is a top view of an example of a wing of an aircraft having a flight control system including a plurality of flight control surfaces that may be operated by one or more hydraulic systems, and which may include one or more booster pumps for momentarily providing increased hydraulic pressure to one or more boostable actuators of the flight control system.

FIG. 2 is a top view of an example of a wing 116 having a plurality of flight control surfaces 130 as part of the aircraft 100 flight control system 150. The flight control surfaces 130 of the wing 116 may include the above-mentioned ailerons 128, one or more leading-edge devices 120 (e.g., slats), one or more trailing edge devices 122 (e.g., flaps 124, flaperons 126), and one or more spoilers 118 (e.g., speedbrakes). Each one of the flight control surfaces 130 may be operated by one or more actuators 164, 200 which may be fluidly coupled to one or more hydraulic systems 152. Although FIG. 2 illustrates a single hydraulic system 152 fluidly coupled to the actuators 164, 200 of the spoilers 118 and the aileron 128, an aircraft 100 may include two or more hydraulic systems 152. In some examples, a flight control surface 130 (e.g., an aileron 128, a spoiler 118) of an aircraft 100 may have two or more actuators 164, 200, each of which may be fluidly coupled to separate hydraulic systems 152 for redundancy.

As shown in FIG. 2, the hydraulic system 152 may include a system pump 154 for providing hydraulic fluid to the hydraulic system 152 at a first working pressure. In addition, the hydraulic system 152 may include a system reservoir 162 for storing hydraulic fluid at the first working pressure. The actuators of the hydraulic system 152 may include one or more boostable actuators 200 and one or more system actuators 164 (e.g., non-boostable actuators). In the present disclosure, the system actuators 164 may be limited to receiving hydraulic fluid at the first working pressure. The boostable actuators 200 may be fluidly coupled to one or more booster pumps 206 for providing hydraulic fluid at a second working pressure which is higher than the first working pressure. The boostable actuators 200 may operate under the first working pressure as the default pressure, and may momentarily operate under the second working pressure when the boost function is activated causing the booster pumps 206 to provide hydraulic fluid to the boostable actuators 200 at the second working pressure. When the boost function is deactivated, the boostable actuators 200 may return to operation under the first working pressure.

In FIG. 2, the system actuators 164 are shown coupled to the spoilers 118, and a pair of boostable actuators 200 are coupled to the aileron 128. However, the aileron 128 and/or any one or more of the spoilers 118 may be actuated by a combination of one or more system actuators 164 and one or more boostable actuators 200. In this regard, the flight control system 150 of the aircraft 100 may include system actuators 164 and/or boostable actuators 200 may be coupled to any one or more of the flight control surfaces 130 including the leading-edge devices and/or the trailing edge devices 122. In addition, other flight control surfaces 130 of the aircraft 100 may be actuated by system actuators 164 and/or boostable actuators 200. For example, the rudder 112 (FIG. 1) may include one or more system actuators 164 and/or one or more boostable actuators 200, and/or the elevators 108 (FIG. 1) may each include one or more system actuators 164 and/or one or more boostable actuators 200. Although the booster pumps 206 in FIG. 2 are shown located proximate the ailerons 128, the booster pumps 206 may be positioned at any location in the aircraft 100. In some examples, a booster pump 206 may be mounted to or integrated into a boostable actuator 200 of a flight control surface 130 such as an aileron 128.

In some examples (e.g., FIGS. 3, 4, and 6) described in greater detail below, the system pump 154 may provide hydraulic fluid at the first working pressure (e.g., the default working pressure) to both the system actuators 164 and the boostable actuators 200 for actuation of the flight control surfaces 130 during the majority of the operating time of the flight control system 150. When the booster pump 206 is activated, hydraulic fluid may be provided to the boostable actuators 200 at a second working pressure while the system actuators 164 continue to be operated under the first working pressure. In other examples (e.g., FIG. 5) described below, the system pump 154 may provide hydraulic fluid at the first working pressure only to the system actuators 164, and not to the boostable actuators 200. In such an example, a boostable actuator 200 may be configured as an electrohydrostatic actuator (EHA) having a dedicated hydraulic system for actuating the boostable actuator 200 under the first working pressure as the default pressure, and momentarily increasing the pressure of the hydraulic fluid to the second working pressure when the boost function is activated.

In one example, the first working pressure of the hydraulic system 152 may be approximately 3000 psi, and the second working pressure may be approximately 5000 psi. However, the first working pressure may be provided in any range (e.g., from 100-3000 psi) for actuation of one or more flight control surfaces 130 of the flight control system 150. Likewise, hydraulic fluid at the second working pressure may be provided by the booster pump 206 in any one of a variety of pressures higher than the first working pressure. For example, a booster pump 206 may be configured to provide hydraulic fluid at a second working pressure in the range of from approximately 5000-8000 psi. In still further examples, a booster pump 206 may be configured to provide hydraulic fluid at a second working pressure of greater than 8000 psi.

Advantageously, the booster pumps 206 and boostable actuators 200 of the presently-disclosed hydraulic system 152 may be actuated for flight conditions wherein the aircraft 100 requires a higher level of performance, and which may occur at outlier conditions in the corners of the flight envelope. For example, an outlier condition may require the momentary actuation of one or more flight control surfaces 130 using a relatively high actuation force to allow for adjustment of the deflection angle of the ailerons 128. In such a scenario, one or more booster pumps 206 may be momentarily activated to provide hydraulic fluid at the second working pressure to a high-pressure side of one or more boostable actuators 200 for actuating the ailerons 128. When the outlier condition is no longer present, the booster pump 206 may be passivated 354 (e.g., deactivated), and the one or more boostable actuators 200 may resume actuating the ailerons 128 at the first working pressure.

By including a boost function in the hydraulic system 152 to momentarily increase the working pressure of the hydraulic fluid to provide high actuation forces (e.g., to meet high control surface rate or hinge moment requirements), the actuators (e.g., hydraulic cylinders) may be sized for nominal flight conditions, reserving the boost function for flight conditions (e.g., outlier conditions of the flight envelope) requiring high actuation forces. In this manner, the hydraulic system 152 may be designed and operated using conventional, hydraulic system pressures (e.g., 3000 psi) which may increase reliability and reduce cost at the system level. Furthermore, the incorporation of the presently-disclosed boost function (e.g., via the addition of the booster pump 206 and boostable actuators 200) into the hydraulic system 152 may avoid the need to increase the size of the hydraulic system components which may thereby enable the use of thin-wing airfoils with reduced aerodynamic drag relative to a larger wing section that would otherwise be required to house hydraulic components sized for high operating pressures (e.g., greater than 3000 psi). In addition, the incorporation of the presently-disclosed boost function into the hydraulic system 152 may enable a reduction or elimination of fairings or blisters that are conventionally used to cover protrusions of the hydraulic components outside of the outer mold line of the wing.

Although the presently-disclosed hydraulic system 152 and method is described in the context of a tube-and-wing aircraft 100 as shown in FIG. 1, the hydraulic system 152 and method may be implemented on any aircraft configuration, without limitation, including a blended wing configuration (not shown), a hybrid wing-body configuration (not shown), and other aircraft configurations. In addition, the presently-disclosed system and method may be implemented on any type of civil, commercial, and/or military aircraft, without limitation. Even further, the hydraulic system 152 and method may be implemented on any type of air vehicle, without limitation where boost function capability is required in one or more hydraulic systems 152 of a flight control system 150 for momentary actuation of a boostable actuator 200 at a second working pressure higher than the first working pressure under which the hydraulic system 152 operates.

Figure 3:
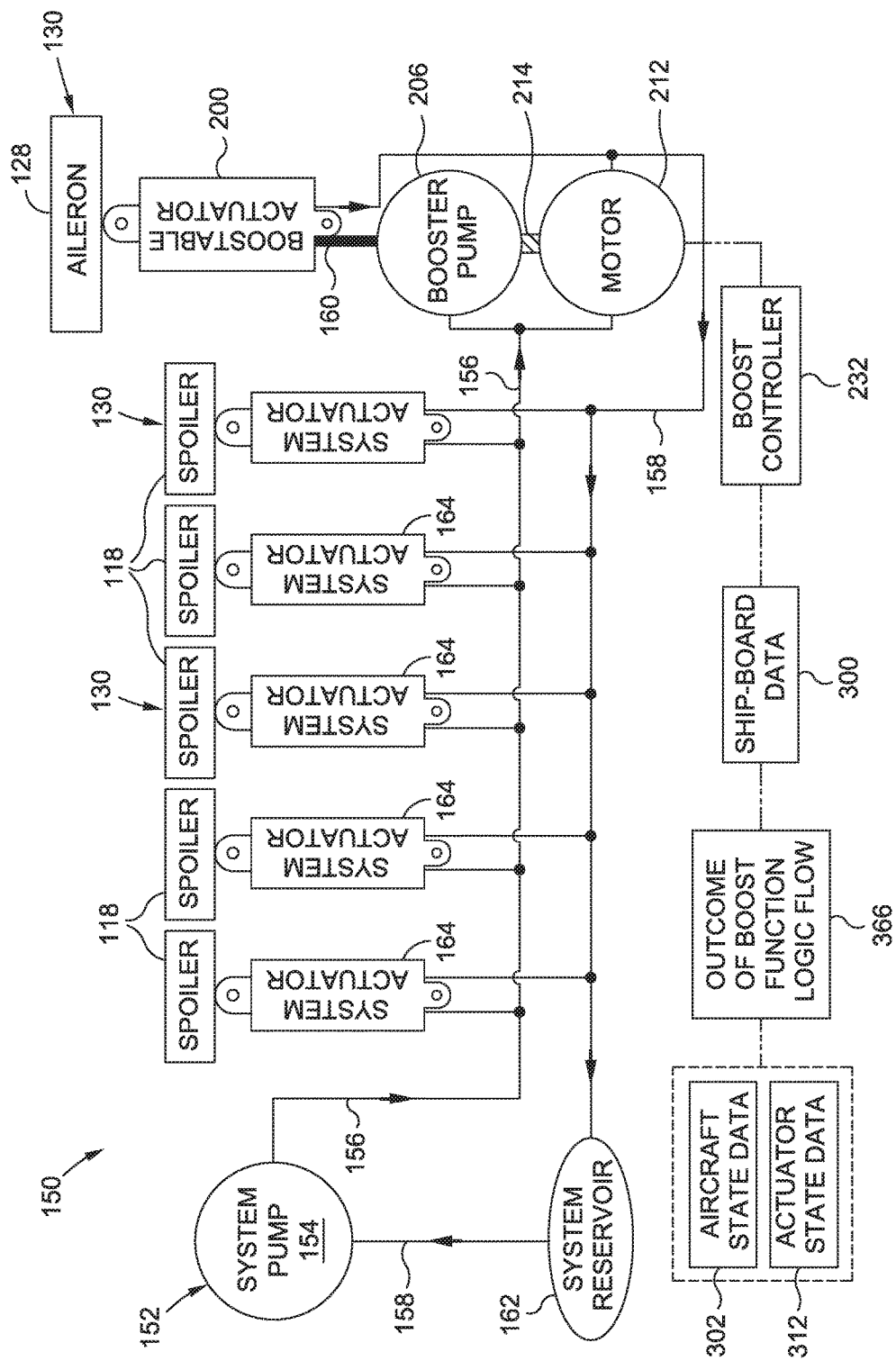
FIG. 3 is an example of a flight control system including a hydraulic system incorporating a booster pump driven by a motor controlled by a boost controller.

FIG. 3 shows an example of a hydraulic system 152 of an aircraft flight control system 150. The hydraulic system 152 incorporates a booster pump 206 driven by a motor 212 controlled by a boost controller 232. The boost controller 232 may be communicatively coupled to a ship-board data 300 connection for receiving aircraft state data 302 and/or actuator state data 312 on a continuous or periodic basis for regulating the operation of the motor 212, as described in greater detail below. As indicated above, the hydraulic system 152 may include a system pump 154 configured to provide hydraulic fluid via nominal pressure supply lines 156 to one or more system actuators 164 (e.g., non-boostable actuators) at a nominal system pressure which is described herein as the first working pressure. The hydraulic system 152 may include nominal pressure return lines 158 for returning hydraulic fluid at the first working pressure to the system pump 154. The hydraulic system 152 may additionally include a system reservoir 162 in the nominal pressure supply line 156 for storing hydraulic fluid.

In some examples, the system pump 154 may be a ship-board hydraulic pump which may be located in the fuselage 102, the wing box, the wing 116, or in another location remote from the boostable actuator 200. The system pump 154 may provide hydraulic fluid at the first working pressure to the system actuators 164 and/or to one or more boostable actuators 200. In one example, the system actuators 164 and/or the boostable actuators 200 may be configured as linear actuators having a piston slidable within a cylinder. However, in other examples not shown, one or more of the system actuators 164 and/or one or more of the boostable actuators 200 may be configured as rotary actuators such as rotary piston actuators or rotary vane actuators.

Referring still to FIG. 3, the booster pump 206 may be fluidly coupled to the boostable actuator 200 via a booster pressure supply line 160. The booster pump 206 may be driven by a motor 212 (e.g., an electric motor or a hydraulic motor) that may be mechanically coupled to the booster pump 206. The booster pump 206 may receive hydraulic fluid from the system pump 154 at the first working pressure. The boostable actuator 200 may be operatively coupled to a flight control surface 130 which is shown as an aileron 128 in the illustrated example. When the booster pump 206 is in a passivated or deactivated state, the boostable actuator 200 may operate under hydraulic fluid at the first working pressure. When the booster pump 206 is activated, the booster pump 206 may increase the pressure of the supplied hydraulic fluid from the first working pressure to the second working pressure, and may supply hydraulic fluid to the boostable actuator 200 at the second working pressure (e.g., a boosted system pressure). The hydraulic fluid at the second working pressure may be supplied to the boostable actuator 200 on either the extend side of the piston, or on the retract side of the piston as necessary to actuate the flight control surface 130 in the required direction according to the flight control command.

Although FIG. 3 illustrates a single booster pump 206 fluidly coupled to a single boostable actuator 200, the booster pump 206 may be augmented by one or more additional booster pumps 206 for providing hydraulic fluid at the second working pressure to a single boostable actuator 200 coupled to a single flight control surface 130, or multiple booster pumps 206 may provide hydraulic fluid at the second working pressure to a respective quantity of boostable actuators 200 coupled to the same flight control surface 130. For example, as shown in FIG. 2, an aileron 128 may be actuated by a first boostable actuator 202 and a second boostable actuator 204 which may receive hydraulic fluid at the second working pressure from a first booster pump 208 and a second booster pump 210, respectively.

Referring still to FIG. 3, the boost controller 232 may be communicatively coupled to the booster pump 206 via the motor 212, and may receive aircraft state data 302 and/or actuator state data 312 via a ship-board data 300 connection for regulating the operation of the motor 212, as described in greater detail below. The boost controller 232 may be programmed to activate the boost function (e.g., activate or operate the booster pump) in a manner providing hydraulic fluid to the boostable actuator 200 at the second working pressure. For example, the boost controller 232 may be programmed to identify when the aircraft 100 is commanded to perform a maneuver. In this regard, the aircraft 100 may receive a flight control command from the flight crew, from an autopilot, and/or from a remote control device (not shown) in the case that the aircraft is configured as a remotely-piloted aircraft such as a drone. Upon identifying that the aircraft 100 has been commanded to perform a maneuver, the boost controller 232 may activate the booster pump 206 (e.g., activate the boost function) in a manner causing the booster pump 206 to provide hydraulic fluid to the boostable actuator 200 at the second working pressure.

In some examples, the activation of the booster pump 206 may cause the booster pump 206 to increase the pressure of the hydraulic fluid from the first working pressure to the second working pressure. The boostable actuator 200 may receive the hydraulic fluid at the second working pressure and may actuate (e.g., reposition, further deflect, partially retract, or completely retract) the flight control surface 130. The boostable actuator 200 may actuate the flight control surface 130 in a manner causing the aircraft 100 to perform the maneuver commanded. During or after the flight control surface 130 has been actuated by the boostable actuator 200 (e.g., after the aircraft 100 has completed the maneuver) at the second working pressure, the boost controller 232 may be programmed to deactivate the booster pump 206 such that the pressure of the hydraulic fluid provided to the boostable actuator 200 is reduced from the second working pressure (e.g., to the first working pressure).

In some examples, the boost controller 232, upon identifying that the aircraft 100 has been commanded to perform a maneuver and prior to activating the booster pump 206, may be programmed to determine whether the boostable actuator 200 acting under the first working pressure is capable of actuating a flight control surface 130 in a manner allowing the aircraft 100 to perform the maneuver as commanded. The boost controller 232 may be programmed to make the determination of whether the boostable actuator 200 is capable of actuating the flight control surface 130 based upon aircraft state data 302 of the aircraft 100 and/or based upon actuator state data 312 of one or more actuators (e.g., boostable actuators 200) to which the flight control surface 130 may be coupled. In some examples, the aircraft state data 302 may include data regarding the current aircraft environment 304 such as the current airspeed 306, altitude, attitude (e.g., roll angle, pitch angle, yaw angle), or other aircraft state data 302 that may be sensed by one or more aircraft sensors (not shown) and provided to the boost controller 232 on a continuous or periodic basis.

Figure 9:
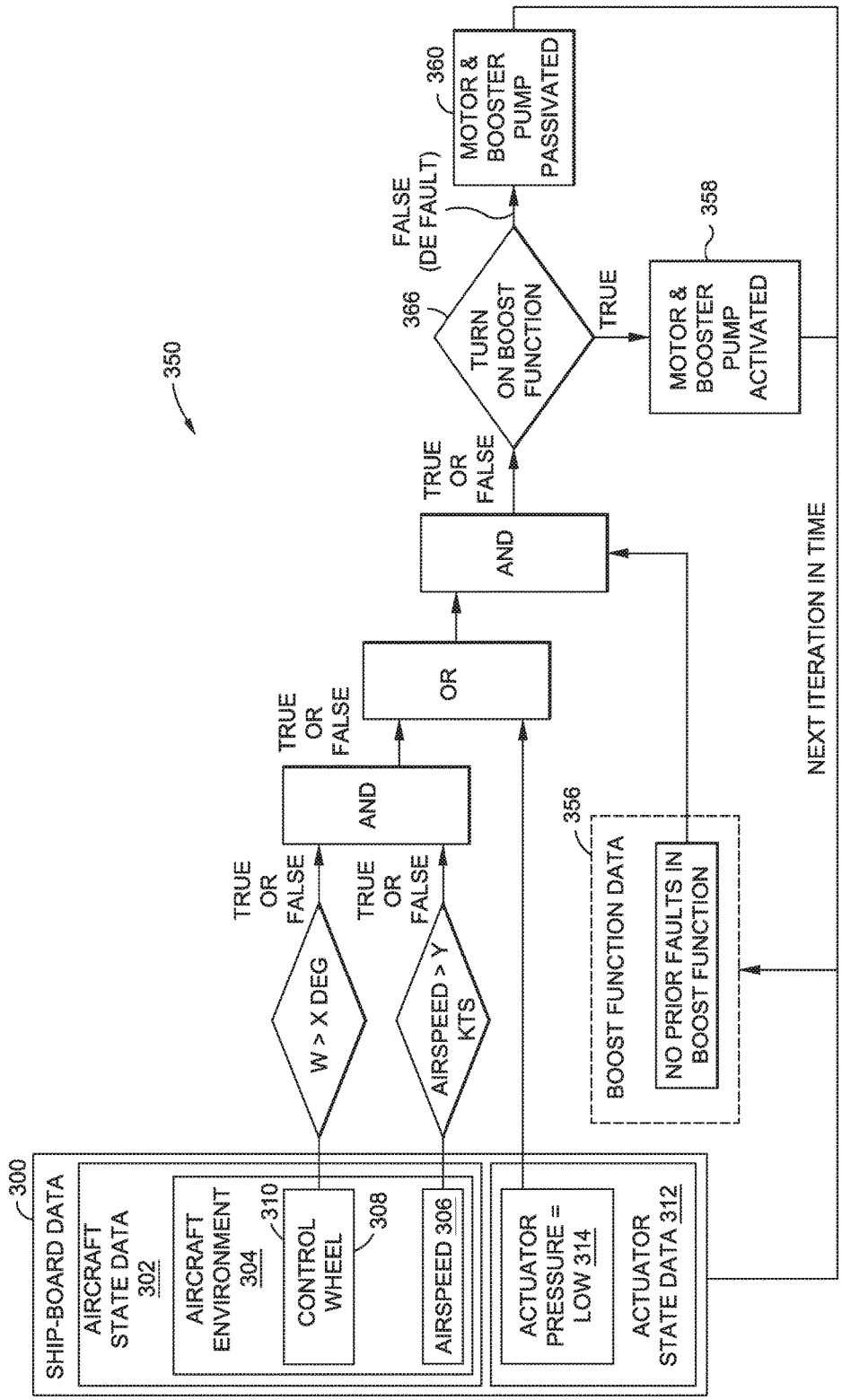
FIG. 9 is a further example of a boost function logic flow diagram for activating a booster pump based on inputs of aircraft state data and/or actuator state data.
Figure 10:
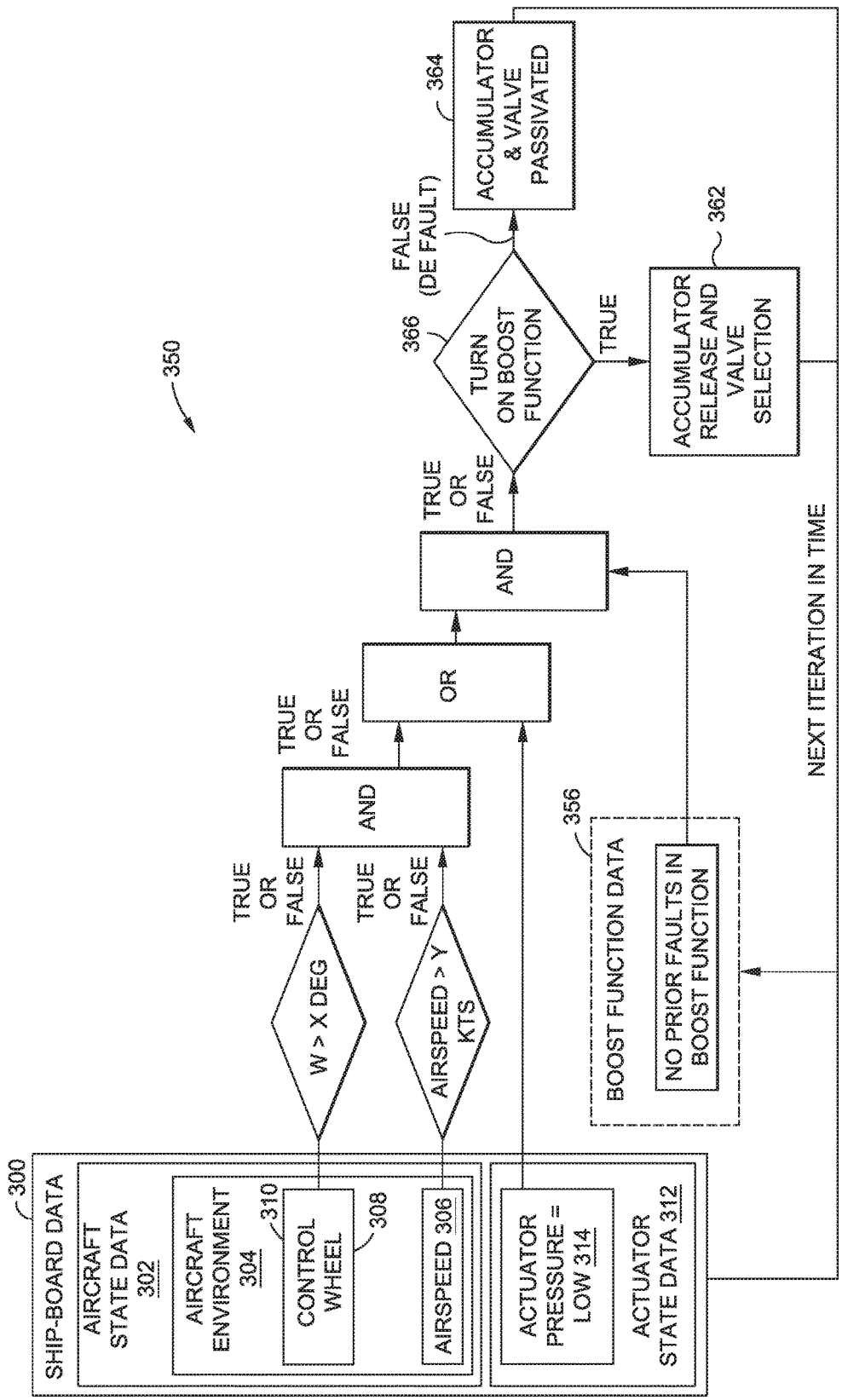
FIG. 10 is an example of a boost function logic flow diagram for activating a booster pump configured as a high-pressure accumulator.

Alternatively or additionally, the aircraft state data 302 used by the boost controller 232 may include data regarding flight control commands from the flight crew such as via control column input 308 from the pilot (shown in FIGS. 9 and 10). Control column input 308 data may include data regarding the magnitude and/or rate of control column inputs 308 or equivalent (e.g., side stick inputs) for aircraft 100 that lack a control column. In some examples, the boost controller 232 may be programmed to determine the capability of the boostable actuator 200 to actuate a flight control surface 130 based on a control wheel input 310 commanded by the flight crew for roll control of the aircraft 100, a control column displacement (e.g. fore/aft movement of the control column) for commanding pitch control of the aircraft 100, a speedbrake control lever position for positioning the spoilers 118, a flap lever setting for positioning the flaps 124, an engine thrust lever setting, and other inputs.

Figure 8:
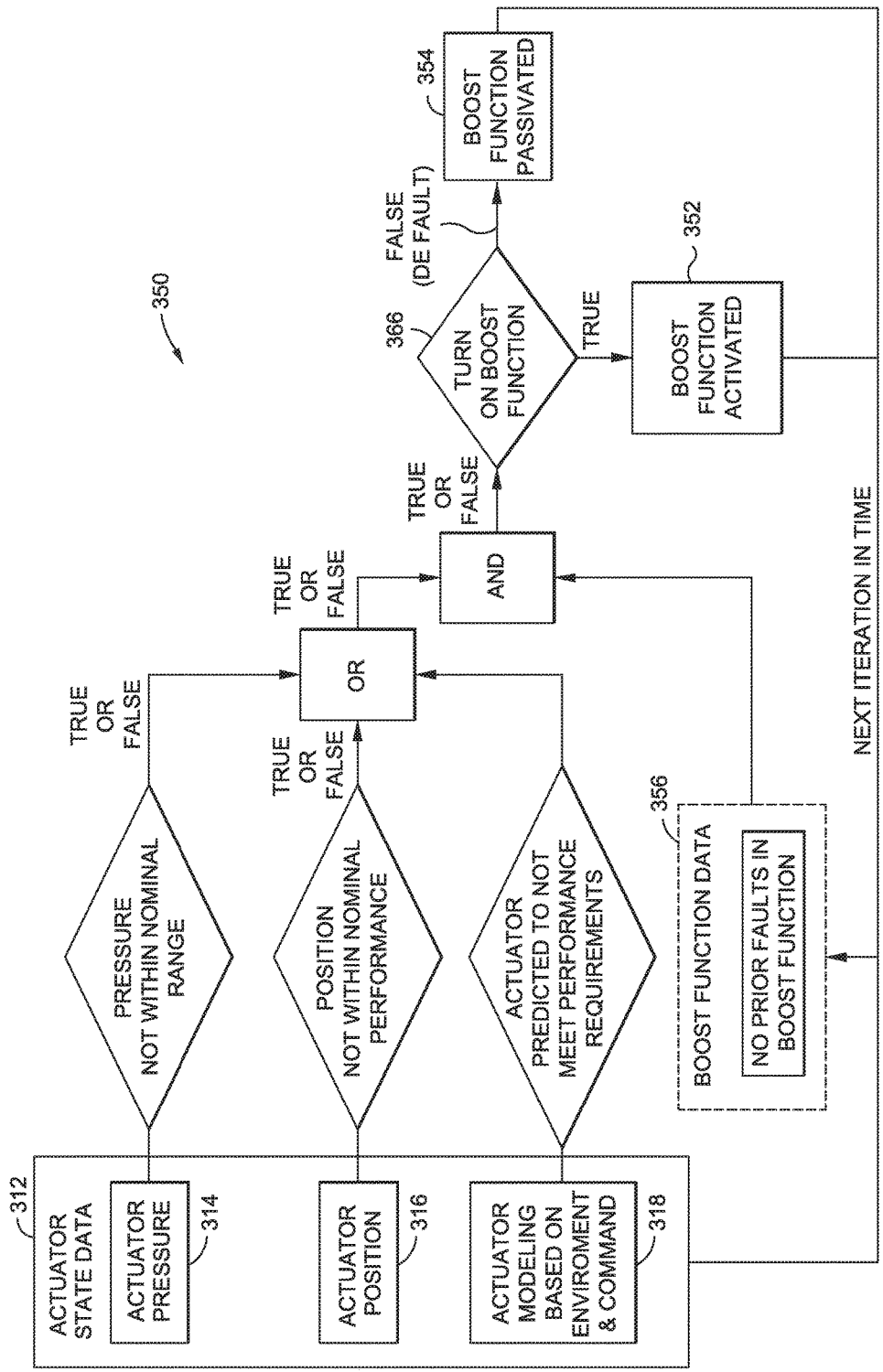
FIG. 8 is an example of a boost function logic flow diagram for activating a boost function of a hydraulic system.

As described in greater detail below, as shown in FIG. 8, the actuator state data 312 used by the boost controller 232 may also include data regarding whether the current actuator pressure 314 of the boostable actuator 200 is operating within a nominal actuator pressure 314 range. For example, if other actuators (e.g., system actuators 164) fluidly coupled to the hydraulic system 152 are demanding flow and hydraulic pressure to the point that the hydraulic pressure available to the boostable actuator 200 is not within the nominal actuator pressure 314 range, then the booster pump 206 may be operated in a manner to temporarily increase the hydraulic pressure to the boostable actuator 200. In an example of a 3000 psi hydraulic system, a nominal hydraulic pressure may be a pressure anywhere between 1200 psi and 3500 psi. If the nominal hydraulic pressure is lower than this range (e.g., lower than 1200 psi—the first working pressure for this example), then the boost function (e.g. the booster pump 206) may increase the hydraulic pressure back up to a pressure (e.g., the second working pressure for this example) within the nominal hydraulic pressure 314 range, absent a detected leak or burst in a hydraulic line.

Referring still to FIG. 8, the aircraft state data 302 used by the boost controller 232 may also include information regarding whether the current actuator position 316 of the boostable actuator 200 is within a nominal actuator position 316 range. For example, if a pilot or autopilot commands one or more actuators (one or more boostable actuators 200 and/or one or more system actuators 164) to a position but the actuator(s) fail to reach the commanded position, the boost function (e.g., the booster pump 206) may provide additional hydraulic pressure to one or more boostable actuators 200 to enable the actuator(s) to reach the commanded position. The current actuator pressure 314 and the current actuator position 316 may be continuously or periodically monitored by one or more actuator sensors (not shown) that may be included with the system actuators 164 and/or the boostable actuators 200. The actuator state data 312 used by the boost controller 232 may also include a prediction as to whether a boostable actuator 200 acting under the first working pressure will be incapable of meeting performance requirements based on the current aircraft environment 304 (e.g., aircraft state data 302) including the nature (e.g., magnitude, rate) of a flight control command commanded by the flight crew, an autopilot, or via remote control. Such a prediction may be determined by actuator modeling 318 (e.g., computer modeling) of the boostable actuator 200 based on the current aircraft state data 302 and/or current actuator state data 312.

Figure 4:
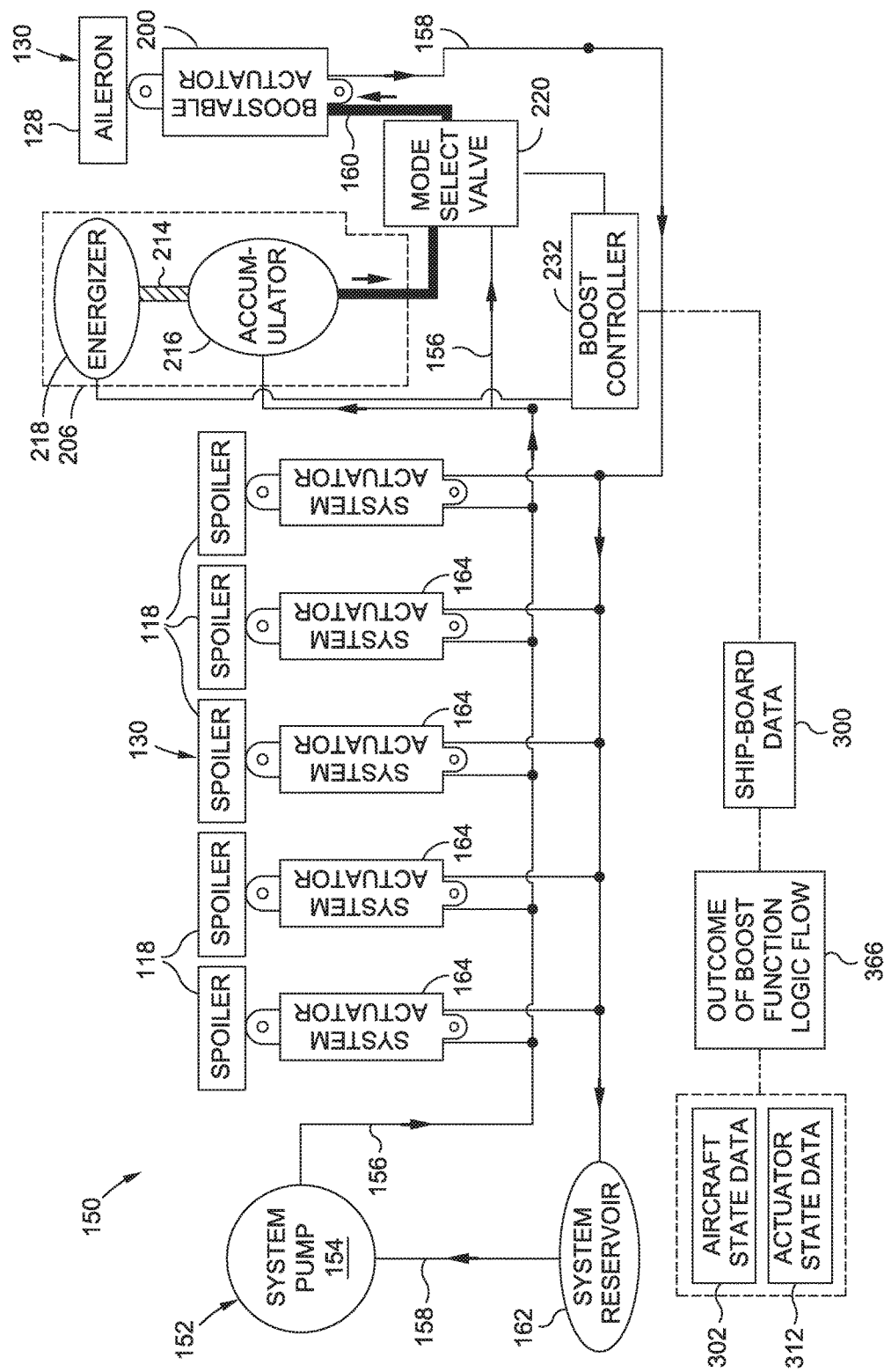
FIG. 4 is an example of a hydraulic system wherein the booster pump is configured as a high-pressure accumulator driven by an accumulator energizer.

FIG. 4 shows an example of a hydraulic system 152 of a flight control system 150 similar to the arrangement shown in FIG. 3. However, in FIG. 4, the booster pump 206 is configured as a high-pressure accumulator 216 driven by an accumulator energizer 218. The high-pressure accumulator 216 may receive hydraulic fluid from the system pump 154 at the first working pressure via a nominal pressure supply line 156. The accumulator energizer 218 may be mechanically coupled to the high-pressure accumulator 216 by a mechanical coupling 214 such as a drive shaft friend not shown). The accumulator energizer 218 may be provided as an electric motor, a spring, or any other device capable of energizing or driving the high-pressure accumulator 216.

In FIG. 4, the booster pump 206 may include a mode selection valve 220 fluidly coupled (e.g., via a boosted pressure supply line 160) between the high-pressure accumulator 216 and the boostable actuator 200. The mode selection valve 220 may receive hydraulic fluid at the first working pressure from the system pump 154 and may also receive hydraulic fluid at the second working pressure from the high-pressure accumulator 216. The mode selection valve 220 may be selectively operated in a manner to provide hydraulic fluid to the boostable actuator 200 at either the first working pressure or at the second working pressure, depending upon whether the boost function has been activated.

For example, when activated by the boost controller 232, the accumulator energizer 218 may increase the pressure of the hydraulic fluid in the high-pressure accumulator 216 from the first working pressure to the second working pressure. The boost controller 232 may operate the mode selection valve 220 such that instead of providing hydraulic fluid at the first working pressure to the boostable actuator 200, the mode selection valve 220 is operated in a manner allowing the high-pressure accumulator 216 to supply hydraulic fluid to the boostable actuator 200 at the second working pressure. Activation of the boost controller 232 and the mode selection valve 220 to provide hydraulic fluid to the boostable actuator 200 at the second working pressure may occur based upon the aircraft state data 302 and/or the actuator state data 312 in a manner described below.

Figure 5:
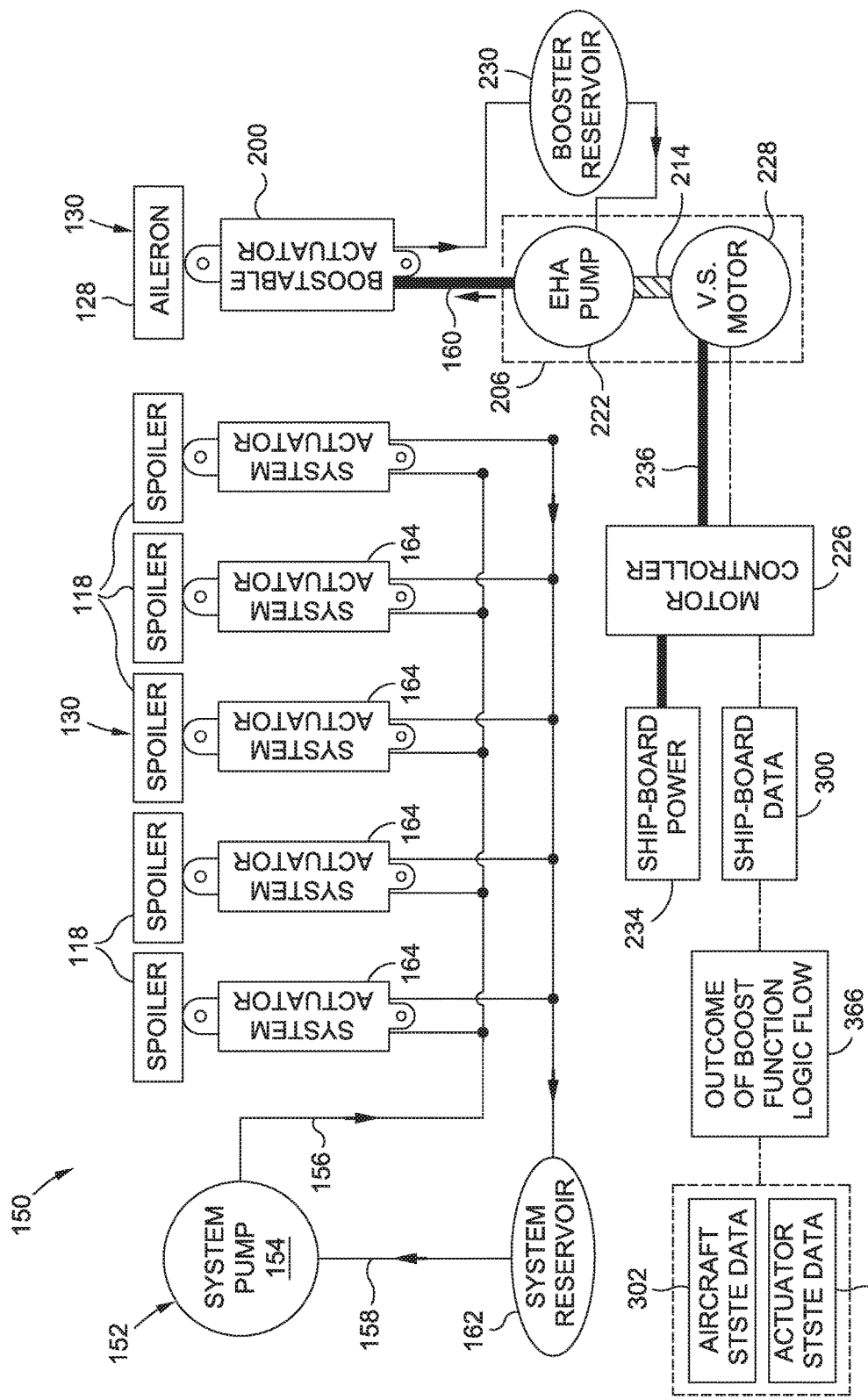
FIG. 5 is an example of a hydraulic system wherein the booster pump is configured as electro-hydrostatic actuator pump driven by a variable speed motor.

FIG. 5 shows an example of a hydraulic system 152 wherein the booster pump 206 is configured as electro-hydrostatic actuator (EHA) pump 222 driven by a variable speed motor 228. The variable speed motor 228 may be mechanically coupled to the EHA pump 222. A booster reservoir 230 for storing hydraulic fluid may be fluidly coupled between the EHA pump 222 and the boostable actuator 200. The EHA pump 222 may receive hydraulic fluid from the booster reservoir 230. The EHA pump 222, the variable speed motor 228, the boostable actuator 200, and optionally the booster reservoir 230 may collectively form an electro-hydrostatic actuator (EHA) which may function as an independent hydraulic system separate from the hydraulic system 152 supplying hydraulic fluid to other actuators (e.g., system actuators 164) of the flight control system 150. The EHA pump 222 may operate on ship-board power 234 (e.g., aircraft electrical power) received through a motor controller 226 via an electrical power line 236. In addition, the motor controller 226 may be communicatively coupled to a ship-board data 300 connection for continuously or periodically receiving aircraft state data 302 and/or actuator state data 312 for regulating the operation of the variable speed motor 228, as described in greater detail below.

The motor controller 226 may be communicatively coupled to the variable speed motor 228 for regulating the operation of the EHA pump 222. When the boost function of the hydraulic system 152 is not activated, the motor controller 226 may be programmed to cause the variable speed motor 228 to rotate the EHA pump 222 in a manner (e.g., at a rotational speed) providing hydraulic fluid to the boostable actuator 200 at the first working pressure. When the boost function is activated, the motor controller 226 may be programmed to cause the variable speed motor 228 to increase the rotational speed of the EHA pump 222 in a manner to increase the pressure of the hydraulic fluid up to the second working pressure for supplying to the boostable actuator 200. When the boost function is deactivated, the motor controller 226 may cause the variable speed motor 228 to reduce the rotational speed of the EHA pump 222 such that the hydraulic pressure provided to the boostable actuator 200 is reduced from the second working pressure to the first working pressure.

Referring still to FIG. 5, the motor controller 226 may be programmed to operate the variable speed motor 228 based upon the aircraft state data 302 and/or the actuator state data 312. For example, in the event that a control wheel input 310 (e.g., for roll control via the ailerons 128) commanded by the flight crew exceeds a threshold angle, the motor controller 226 may cause the variable speed motor 228 to increase the rotational speed of the EHA pump 222 so that the pressure of the hydraulic fluid provided to the boostable actuator 200 is increased from the first working pressure to the second working pressure. Additionally or alternatively, in the event that the control wheel input 310 (e.g., for roll control of the aircraft 100 via the ailerons 128) commanded by the flight crew exceeds a threshold angle, and/or if the airspeed 306 of the aircraft 100 exceeds a threshold airspeed, the motor controller 226 may cause the variable speed motor 228 to increase the rotational speed of the EHA pump 222 so that hydraulic fluid is provided to the boostable actuator 200 at the second working pressure.

In a further example, if it is determined that the current actuator operating pressure of a second actuator (a system actuator 164 or a second boostable actuator 204—not shown) coupled to the aileron 128 is below a threshold operating pressure, the motor controller 226 may cause the variable speed motor 228 to increase the rotational speed of the EHA pump 222 so that hydraulic fluid is provided to the boostable actuator 200 at the second working pressure. As may be appreciated, in any one of the hydraulic system 152 examples disclosed herein, there may be any one of a variety of different conditions based upon aircraft state data 302 and/or actuator state data 312 that trigger the activation of the boost function of the hydraulic system, and which may cause hydraulic fluid to be at least momentarily provided to the boostable actuator 200 at the second working pressure as a means to enable the flight control surface 130 to be actuated in a manner corresponding to a flight control command from the flight crew, an autopilot, by remote control, or as a result of an autonomous functionality of the flight control system 150 such as the above-mentioned maneuver load alleviation or gust load alleviation.

Figure 6:
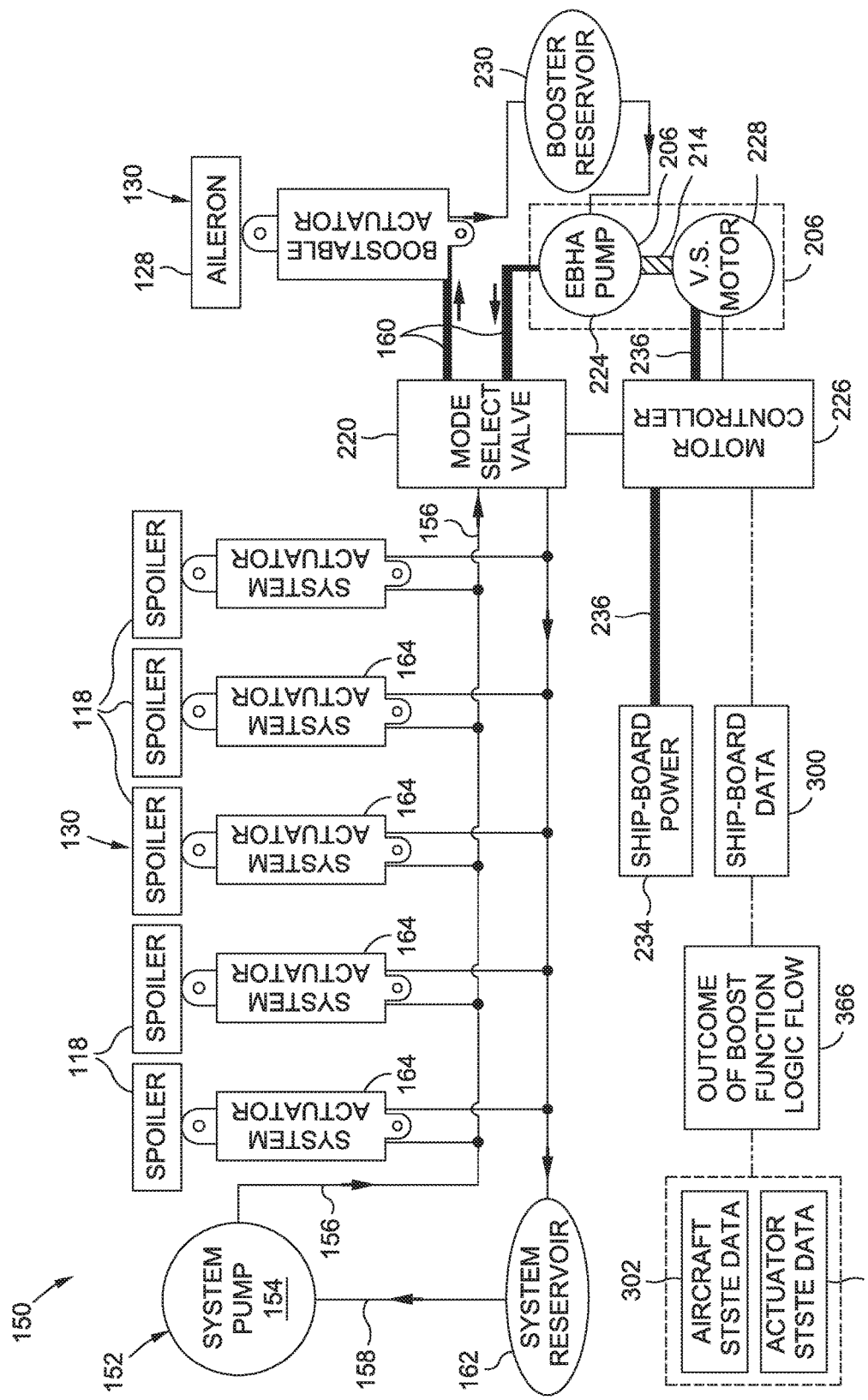
FIG. 6 is an example of a hydraulic system wherein the booster pump is configured as an electric backup hydraulic actuator pump driven by a variable speed motor.

FIG. 6 shows an example of a hydraulic system 152 wherein the booster pump 206 is configured as an electric backup hydraulic actuator (EBHA) pump 224 driven by a variable speed motor 228. The variable speed motor 228 may be mechanically coupled to the EBHA pump 224 which may include a hydraulic stage (not shown) and an electric stage (not shown). A booster reservoir 230 may be fluidly coupled between the EBHA pump 224 and the boostable actuator 200. A mode selection valve 220 may be fluidly coupled between the EBHA pump 224 and the boostable actuator 200. The mode selection valve 220 may receive hydraulic fluid at the first working pressure from the system pump 154, and may receive hydraulic fluid at the second working pressure from the EBHA pump 224. The mode selection valve 220 may be operated to selectively provide hydraulic fluid to the boostable actuator 200 at either the first working pressure or the second working pressure.

The EBHA pump in combination with the variable speed motor 228, the boostable actuator 200, and optionally the booster reservoir 230 may collectively form an electric backup hydraulic actuator which may be operated independent of the hydraulic system 152. The variable speed motor 228 may be regulated by the motor controller 226. The motor controller 226 may receive electrical power from a connection to ship-board power 234 via an electrical power line 236. In addition, the motor controller 226 may be communicatively coupled to ship-board data 300 for receiving aircraft state data 302 and/or actuator state data 312 for regulating the operation of the variable speed motor 228.

Under nominal conditions, the motor controller 226 may control the mode selection valve 220 such that hydraulic fluid at the first working pressure from the system pump 154 is provided to the boostable actuator 200. When the boost function is activated 350 by the motor controller 226, the motor controller 226 may operate the mode selection valve 220 and the variable speed motor 228 in a manner causing the EBHA pump 224 to provide hydraulic fluid to the boostable actuator 200 at the second working pressure. In this regard, the EBHA pump 224 may be operated such that the summed output of the hydraulic stage and the electric stage pressurizes the hydraulic fluid to the second working pressure for delivery to the boostable actuator 200.

The motor controller 226 may be programmed to operate the variable speed motor 228 and the mode selection valve 220 in a manner causing the EBHA pump 224 to supply hydraulic fluid at the second working pressure to the boostable actuator 200 for any one of a variety of different conditions requiring boost function. For example, such conditions may include a control wheel input 310 exceeding a threshold angle, an airspeed 306 exceeding a threshold airspeed, and/or the current actuator operating pressure of a second actuator (not shown) being below a threshold operating pressure. As indicated above with regard to the description of FIG. 5, a second actuator (a system actuator 164 or a second boostable actuator) may be described as another actuator coupled to same flight control as the boostable actuator 200.

Figure 7:
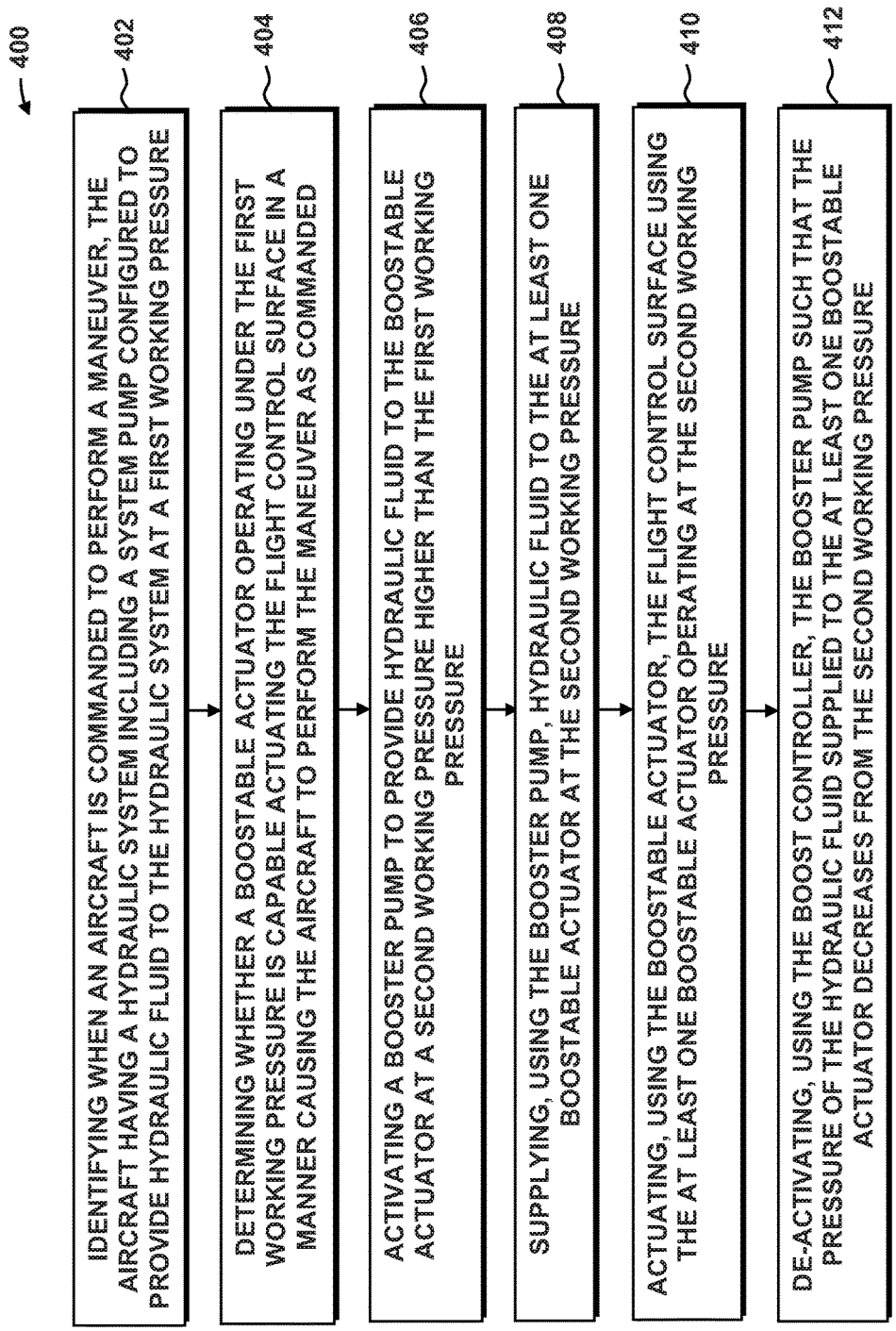
FIG. 7 is an illustration of a flowchart having one or more operations that may be included in a method of operating a hydraulic system of a flight control system of an aircraft.

FIG. 7 shows a flowchart having one or more operations that may be included in an example of a method 400 of operating a hydraulic system 152 of a flight control system 150 having boost function capability. Step 402 of the method 400 may include identifying, using a boost controller 232 (e.g., FIGS. 3-4) or a motor controller 226 (e.g., FIG. 5-6), when an aircraft 100 is commanded to perform a maneuver. As indicated above, a flight control command may be initiated by the flight crew, by an autopilot, and/or by a remote control device. A command may also be described as an autonomous function performed by the flight control system 150 such as the above-described gust load alleviation or maneuver load alleviation during which one or more flight control surfaces 130 (e.g., the ailerons 128) may be momentarily adjusted in a manner to reduce structural loads on the wings 116 in the event that the aircraft 100 encounters turbulence or wind gusts, and/or when the aircraft 100 is performing a maneuver that may subject the airframe (e.g., the wings 116) to relatively high structural loads.

Step 404 of the method 400 may include determining whether the boostable actuator 200 operating under the first working pressure is capable actuating the flight control surface 130 in a manner causing the aircraft 100 to perform the maneuver as commanded. The determination as to whether the boostable actuator 200 is capable of actuating the flight control surface 130 may be based upon aircraft state data 302 and/or actuator state data 312, as mentioned above. In some examples, Step 404 may be performed after determining that the aircraft 100 has been commanded to perform a maneuver. The determination as to whether the boostable actuator 200 is capable of actuating the flight control surface 130 may be based on the capability of the boostable actuator 200 acting alone under the first working pressure, or may be based on the capability of the boostable actuator 200 operating under the first working pressure in combination with one or more additional actuators acting under the first working pressure, and which may be coupled to the same flight control surface 130 as the boostable actuator 200. In addition, the determination may be based upon the nature of the command including, but not limited to, the commanded actuator setting (e.g., the magnitude of the commanded deflection angle) of the flight control surface 130, and/or the determination may be based upon the commanded actuation rate of the flight control surface 130.

FIG. 8 shows an example of a boost function logic flow 350 diagram for determining whether to activate the boost function capability (e.g., activate the booster pump) of the hydraulic system 152. The determination may be performed by the boost controller 232 (e.g., FIG. 3) and may be based upon actuator state data 312 that may be continuously or periodically provided to the boost controller 232, and may include the current actuator pressure 314 of the boostable actuator 200, the current actuator position 316 of the boostable actuator 200, and/or actuator modeling 318 predicting the performance capability of the boostable actuator 200. In FIG. 8, if the current actuator pressure 314 of the boostable actuator 200 falls outside of a nominal actuator pressure range, and/or if the current actuator position 316 of the boostable actuator 200 falls outside of a nominal actuator position range, and/or if computer modeling of the boostable actuator 200 predicts the inability of the boostable actuator 200 to perform the commanded maneuver based upon the current aircraft environment 304 or the nature of the flight control command, then the logic flow diagram considers boost function data 356. In considering boost function data 356, the boost controller 232 may review a time history of the boost function performance to determine whether any prior faults occurred. If no prior faults occurred during activation of a previous boost function of the hydraulic system 152, and if at least one of the above-described actuator conditions regarding actuator pressure 314, actuator position 316, and actuator modeling 318 is true, then the boost function (e.g., the booster pump) may be activated 350, as indicated in block 352 of FIG. 8, and illustrated by the boost function logic flow outcome 366.

Activation of the boost function may entail activation and/or operation of the booster pump 206 in Step 406 in a manner providing hydraulic fluid to the boostable actuator 200 at the second working pressure, as described below. In this regard, Step 406 may include using the boost controller 232 to activate the booster pump 206 to provide hydraulic fluid to the boostable actuator 200 at the second working pressure. The method may include mechanically driving the booster pump 206 using an electric motor or a hydraulic motor. In some examples, the method may include receiving, at the booster pump 206, hydraulic fluid from the system pump 154 at the first working pressure, and increasing the pressure of the supplied hydraulic fluid from the first working pressure to the second working pressure using the booster pump 206. The booster pump 206 may be activated after determining that the boostable actuator 200 and/or any other actuator (e.g., a system actuator 164 or a second boostable actuator) acting alone or in conjunction with the boostable actuator 200 operating under the first working pressure is incapable of actuating the flight control surface 130. If the boost function is not activated, then the default is that the boost function remains in a passivated 354 state, which may correspond to hydraulic fluid being provided to the boostable actuator 200 at the first working pressure.

FIG. 9 is an example of a boost function logic flow 350 diagram for determining whether to activate the booster pump 206 of the hydraulic system 152 illustrated in FIGS. 3, 5, and 6. The boost function logic flow 350 diagram may be based on inputs of aircraft state data 302 and/or actuator state data 312 which, as indicated above, may be continuously or periodically provided to the boost controller 232 via a connection to the ship-board data 300. In the example shown, the motor controller 226 may be programmed to determine whether the boostable actuator 200 operating under the first working pressure is capable of actuating the flight control surface 130 in a manner causing the aircraft 100 to perform a maneuver as commanded. The motor controller 226 may make the determination based upon aircraft state data 302 regarding the aircraft environment 304 such as (1) whether a control wheel input 310 (e.g., a turn angle of the control wheel) exceeds a threshold angle, and (2) whether an airspeed 306 exceeds a threshold airspeed. If the above two conditions are both true, and/or if the actuator operating pressure of a second actuator coupled to the flight control surface 130 is below a threshold operating pressure, then the motor controller 226 may determine whether prior faults occurred (e.g., in the hydraulic system 152 and/or in the booster motor 212 and/or associated components) during a previously-activated boost function. If no prior faults occurred, then the motor controller 226 may be programmed to activate or operate the motor 212 (e.g., FIG. 3; or the variable speed motor 228 of FIGS. 5-6) and/or the booster pump 206 (e.g., FIG. 3; or the EHA pump 222 of FIG. 5; or the EBHA pump 224 and mode selection valve 220 of FIG. 6), as indicated in block 358 of FIG. 9, and as shown by the boost function logic flow outcome 366. Activation of the boost function may result in the booster pump 206 providing hydraulic fluid to the boostable actuator 200 at the second working pressure, as described below. If not activated, then the boost function may remain in a passivated 354 state, which may correspond to the booster pump 206 continue to provide hydraulic fluid to the boostable actuator 200 at the first working pressure.

For the hydraulic system 152 shown in FIG. 4, the step of determining whether to activate the high-pressure accumulator 216 (e.g., the booster pump) may be performed according to the boost function logic flow 350 diagram shown in FIG. 10. The determination of whether to activate the high-pressure accumulator 216 may be based upon aircraft state data 302 and/or actuator state data 312, in a manner similar to FIG. 9. The step of activating the booster pump 206 (FIG. 4) may include receiving, at the high-pressure accumulator 216, the hydraulic fluid from the system pump 154 at the first working pressure, and driving the high-pressure accumulator 216 using the accumulator energizer 218 to increase the pressure of the hydraulic fluid in the high-pressure accumulator 216 from the first working pressure to the second working pressure. In addition, the method may include receiving, at a mode selection valve 220, hydraulic fluid at the first working pressure from the system pump 154 and hydraulic fluid at the second working pressure from the high-pressure accumulator 216. If the boost function is activated as indicated by the boost function logic flow outcome 366 of FIG. 10, the boost controller 232 may operate the mode selection valve 220 and the high-pressure accumulator 216 causing the release of hydraulic fluid to the boostable actuator 200 at the second working pressure, as indicated in block 362 of FIG. 10. If not activated, the high-pressure accumulator 216 and the mode selection valve 220 may remain passivated as indicated in block 364 of FIG. 10, and which may entail operation of the mode selection valve 220 in a manner such that hydraulic fluid is provided to the boostable actuator 200 at the first working pressure.

For the hydraulic systems 152 shown in FIGS. 5-6, the step of activating the booster pump 206 may include activating or operating the variable speed motor 228 using the motor controller 226. As shown, the variable speed motor 228 may be mechanically coupled to the EHA pump 222 in FIG. 5, or to the EBHA pump 224 in FIG. 6. The EHA pump 222 in FIG. 5 may receive hydraulic fluid from the booster reservoir 230. The EBHA pump 224 in FIG. 6 may receive hydraulic fluid at the first working pressure from the system pump 154. The step of activating the booster pump 206 may include rotating the EHA pump 222 or EBHA pump 224 using the variable speed motor 228 in a manner to increase the pressure of the hydraulic fluid up to the second working pressure.

Step 408 of the method 400 may include supplying, using the booster pump 206, hydraulic fluid to the boostable actuator 200 at the second working pressure which is higher than the first working pressure. For the hydraulic system 152 shown in FIG. 4, the method may include using the boost controller 232 to operate the mode selection valve 220 in a manner causing hydraulic fluid to be provided to the boostable actuator 200 at the second working pressure. For the hydraulic system 152 shown in FIG. 6, the method may include using the motor controller 226 to operate the mode selection valve 220 to cause hydraulic fluid to be provided to the boostable actuator 200 at the second working pressure.

Step 410 of the method 400 may include actuating the flight control surface 130 using the boostable actuator 200 operating with the hydraulic fluid at the second working pressure. The flight control surface 130 may be actuated in a manner causing the aircraft 100 to at least initiate the maneuver as commanded and/or at least partially perform the maneuver as commanded. In the present example, the step of actuating the flight control surface 130 may include actuating an aileron 128 using the boostable actuator 200 at the second operating pressure. However, as indicated above, the boostable actuator 200 or any combination of boostable actuators 200 may be operated to actuate any type of flight control surface 130, without limitation. For example, one or more boostable actuators 200 may be operated to actuate one or more spoilers 118, one or more wing leading edge devices 120 (e.g., slats), one or more wing trailing edge devices 122 such as flaps 124 or flaperons 126, one or more tail surfaces such as an elevator 108 of a horizontal tail 106 or a rudder 112 of a vertical tail 110, or other flight control surfaces.

Step 412 of the method 400 may include de-activating the boost function of the boostable actuator 200 using the boost controller 232. For example, as indicated above, the step of deactivating the boost function may include operating the booster pump 206 such that the pressure of the hydraulic fluid supplied to the boostable actuator 200 is decreased from the second working pressure to the first working pressure. The step of deactivating the boost function may be performed during or after the flight control surface 130 has been actuated by the boostable actuator 200 at the second working pressure in a manner causing the aircraft 100 to at least initiate the performance of the maneuver commanded.

In other examples, the boost function may be deactivated after the aircraft 100 has completed the maneuver.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A hydraulic system of an aircraft, comprising:
a plurality of non-boostable actuators and at least one boostable actuator each operatively coupled to a different flight control surface of an aircraft;
a system pump fluidly coupled to the plurality of non-boostable actuators via a nominal pressure supply line configured to transfer hydraulic fluid at a first working pressure, each non-boostable actuator acting under the first working pressure to actuate one of the flight control. surfaces;
a booster pump fluidly coupled only to the at least one boostable actuator via a boosted pressure supply line designed to withstand a higher pressure than the nominal pressure supply line, the nominal pressure supply line incapable of receiving hydraulic fluid at the higher pressure from the booster pump, the boosted pressure supply line transferring hydraulic fluid at a second working pressure higher than the first working pressure;
the booster pump fluidly coupled to the system pump via the nominal pressure supply line for receiving the hydraulic fluid at the first working pressure;
the non-boostable actuators excluded from receiving hydraulic fluid from the booster pump;
the booster pump switchable between a passivated state and an activated state;
the booster pump in the passivated state providing the hydraulic fluid to the at least one boostable actuator at the first working pressure, the boostable actuator acting under the first working pressure to actuate one of the flight control surfaces different than the flight control surfaces actuated by the non-boostable actuators;
the booster pump in the activated state increasing a pressure of the hydraulic fluid from the first working pressure to the second working pressure, and supplying the hydraulic fluid at the second working pressure to the at least one boostable actuator for actuating the at least one boostable actuator at the second working pressure.

2. The hydraulic system of claim 1, further comprising:
a boost controller communicatively coupled to the booster pump, the boost controller programmed to:
identify when the aircraft is commanded to perform a maneuver;
switch the booster pump from the passivated state to the activated state to provide hydraulic fluid to the at least one boostable actuator at the second working pressure upon identifying that the aircraft is commanded to perform the maneuver; and
switch the booster pump from the activated state to the passivated state such that the pressure of the hydraulic fluid decreases from the second working pressure during or after the flight control surface has been actuated by the at least one boostable actuator causing the aircraft to perform the maneuver.

3. The hydraulic system of claim 2, wherein:
the boost controller, upon identifying that the aircraft is commanded to perform the maneuver and prior to switching the booster pump from the passivated state to the activated state, further programmed to determine that the boostable actuator acting under the first working pressure is incapable of actuating the flight control surface causing the aircraft to perform the maneuver as commanded based upon at least one of aircraft state data and actuator state data.

4. The hydraulic system of claim 3, wherein:
the aircraft state data comprises at least one of the following:
an aircraft environment; and
a control column input;
the actuator state data comprises at least one of the following:
a current actuator pressure of the boostable actuator is outside of a nominal actuator pressure range; and
a current actuator position of the boostable actuator is outside of a nominal actuator position range.

5. The hydraulic system of claim 1, wherein:
the at least one flight control surface comprises an aileron of an aircraft wing.

6. The hydraulic system of claim 1, wherein:
the first working pressure is approximately 3000 psi and the second working pressure is in a range of from approximately 5000-8000 psi.

7. A hydraulic system for an aircraft, comprising:
a plurality of non-boostable actuators each operatively coupled to a different flight control surface of an aircraft;
a first boostable actuator and a second boostable actuator operatively coupled to a common flight control surface excluded from the flight control surfaces of the non-boostable actuators, the common flight control surface comprising one of an aileron, a rudder, or an elevator;
a system pump fluidly coupled to the plurality of non-boostable actuators via a nominal pressure supply line configured to transfer hydraulic fluid to at a first working pressure, each non-boostable actuator acting under the first working pressure to respectively actuate one of the flight control surfaces;
a first booster pump and a second booster pump fluidly coupled respectively to only the first boostable actuator and the second boostable actuator via a boosted pressure supply line designed to withstand a higher pressure than the nominal pressure supply line, the nominal pressure supply line incapable of receiving hydraulic fluid at the higher pressure from the booster pump, the boosted pressure supply line transferring hydraulic fluid at a second working pressure higher than the first working pressure;
the first booster pump and the second booster pump fluidly coupled to the system pump via the nominal pressure supply line for receiving the hydraulic fluid at the first working pressure;
the non-boostable actuators excluded from receiving hydraulic fluid from either the first booster pump or the second booster pump;
the first booster pump and the second booster pump each switchable between a passivated state and an activated state; the first booster pump and the second booster pump in the passivated state providing the hydraulic fluid respectively to the first boostable actuator and the second boostable actuator at the first working pressure for actuating the common flight control surface comprising one of the aileron, the rudder, or the elevator; and the first booster pump and the second booster pump in the activated state increasing the pressure of the hydraulic fluid to the second working pressure and providing the hydraulic fluid respectively to the first boostable actuator and the second boostable actuator at the second working pressure for actuating the common flight control surface of one of the aileron, the rudder, or the elevator.

8. A method of operating a hydraulic system of a flight control system of an aircraft having a plurality of non-boostable actuators and at least one boostable actuator each operatively coupled to a different flight control surface of the aircraft, the hydraulic system having a system pump fluidly coupled to the plurality of non-boostable actuators via a nominal pressure supply line configured to transfer hydraulic fluid at a first working pressure, the method comprising the steps of:

receiving, at a booster pump, the hydraulic fluid at the first working pressure from the system pump via the nominal pressure supply line, the booster supplying the hydraulic fluid only to the at least one boostable actuator via a boosted pressure supply line designed to withstand a higher pressure than the nominal pressure supply line, the nominal pressure supply line incapable of receiving hydraulic fluid at the higher pressure from the booster pump, the boosted pressure supply line transferring hydraulic fluid at a second working pressure higher than the first working pressure, the non-boostable actuators excluded from receiving hydraulic fluid from the booster pump;

identifying, using a boost controller communicatively coupled to the booster pump, when the aircraft is commanded to perform a maneuver;

activating, using the boost controller, the booster pump to increase a pressure of the hydraulic fluid from the first working pressure to the second working pressure after determining that the at least one boostable actuator operating under the first working pressure is incapable of actuating the flight control surface to which the boostable actuator is operatively coupled;

supplying, using the booster pump, the hydraulic fluid to the at least one boostable, actuator at the second working pressure via the boosted pressure supply line;

actuating the flight control surface using the at least one boostable actuator operating at the second working pressure; and de-activating, using the boost controller, the booster pump such that the pressure of the hydraulic fluid supplied to the at least one boostable actuator decreases from the second working pressure.

9. The method of claim 8, further including: determining, upon identifying that the aircraft is commanded to perform the maneuver and prior to activating the booster pump, whether the boostable actuator acting under the first working pressure is capable of actuating the flight control surface in a manner causing the aircraft to perform the maneuver as commanded based upon at least one of aircraft state data and actuator state data.

10. The method of claim 9, wherein: the aircraft state data comprises at least one of the following: a current aircraft environment; and a control column input; the actuator state data comprises at least one of the following; a current actuator pressure of the boostable actuator is outside of a nominal actuator pressure range; and a current actuator position of the boostable actuator is outside of a nominal actuator position range.

11. The method of claim 8, wherein the step of activating the booster pump comprises: receiving, at the booster pump, hydraulic fluid from the system pump at the first working pressure; and increasing, using the booster pump, the pressure of the supplied hydraulic fluid from the first working pressure to the second working pressure.

12. The method of claim 9, wherein the step of determining whether the boostable actuator operating under the first working pressure is capable of actuating the flight control surface in a manner causing the aircraft to perform the maneuver as commanded includes: determining whether at least one of: a control wheel input exceeds a threshold angle; an airspeed exceeds a threshold airspeed; an actuator operating pressure of a second actuator is below a threshold operating pressure; and the boostable actuator operating under the first working pressure is insufficient to meet performance requirements.

13. The method of claim 8, wherein the step of actuating the flight control surface comprises: actuating an aileron using the at least one boostable actuator.

* * * * *